United States Patent
Tanaka et al.

(12)

(10) Patent No.: US 6,376,589 B1
(45) Date of Patent: Apr. 23, 2002

(54) COATING COMPOSITION CAPABLE OF FORMING A THICK COATING FILM

(75) Inventors: Shoichi Tanaka, Chigasaki; Hideyuki Abe, Amagasaki, both of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/339,245

(22) Filed: Jun. 24, 1999

(30) Foreign Application Priority Data

Jun. 24, 1998 (JP) .......................................... 10-176479

(51) Int. Cl.$^7$ ............................................ C09D 175/06
(52) U.S. Cl. ...................... 524/413; 524/493; 524/497; 524/507; 524/538; 524/539; 525/124; 525/424; 525/440
(58) Field of Search ................................. 525/440, 124, 525/424; 524/493, 413, 497, 507, 538, 539

(56) References Cited

U.S. PATENT DOCUMENTS 4,457,965 A * 7/1984 Rocholl ...................... 428/141
4,879,356 A * 11/1989 Gras ........................... 525/440

FOREIGN PATENT DOCUMENTS

DE 4338265 12/1994
EP 0288964 11/1988

OTHER PUBLICATIONS

Database WPI, Section Ch, Week 199925, Derwent Publications Ltd., London, GB; Class A23, AN 1999–296644, XP002159176 & JP11 100548 A (Nippon Paint Co Ltd), Apr. 13, 1999.

* cited by examiner

*Primary Examiner*—Patricia A. Short
(74) *Attorney, Agent, or Firm*—Wenderoth, Lind & Ponack, L.L.P.

(57) ABSTRACT

There is disclosed a coating composition comprising a binder component consisting of (A') hydroxyl group-containing polyester resin having a number average molecular weight of 2,000–20,000, glass transition temperature of −40° C. to 30° C. and hydroxyl value of 5–95 mgKOH/g, (B) blocked polyisocyanate compound blocked with ε-caprolactam, and the equivalent ratio of the blocked isocyanate groups in said blocked polyisocyanate compound (B)/the hydroxyl groups in said polyester resin (A) being in the range of 0.7–1.2, and 0.5–30 parts by weight of said resin fine particles (C) with an average particle diameter of 8–70 μm, which do not completely melt at the time of coating film curing, per 100 parts by weight of said binder component. Said coating composition can form a coating film having excellent popping resistance, hardness, processibility, anti-tackiness, blocking resistance and curability by a high temperature short time baking.

13 Claims, No Drawings

COATING COMPOSITION CAPABLE OF FORMING A THICK COATING FILM

BACKGROUND OF THE INVENTION

1. Field of the Invention

The present invention relates to a coating composition capable of forming a thick coating film which has excellent hardness, processibility, corrosion resistance and blocking resistance, and a coated metal plate coated by using coating composition.

2. Description of the Prior Art

As a topcoat paint for precoated steel plate for vessels processing or building materials which are coated by a continuous coating such as coil coating, paints comprising polyester type resin system, having polyester resin as a base resin and combining methyletherified methylolmelamine resin or polyisocyanate compound as a crosslinking agent, are being largely used up to the present. As the baking of the coating film with these polyester resin type topcoat paints at the production of precoated steel plate is conducted usually at a high temperature for a short time, the popping (bubbling of the coating film) tends to occur, if the coating film thickness is thick. Therefore, it was difficult to form a thick coating film of film thickness of more than 25 $\mu$m with a polyester resin type topcoat paint by one coating/baking operation.

For a coating film on a precoated steel plate, further improvement of durability such as corrosion resistance, in addition to hardness and processibility, is required. If it is possible to make a thick topcoating film, it will be advantageous in view of durability. However, it was difficult to form a thick film by one topcoat coating/baking operation up to the present in respect of popping resistance at a high temperature short time baking. Therefore it was necessary for making a thick film to coat topcoat paints several times in layers. However, for coating topcoat paints several times in layers it is necessary to wind up the coated plate in a coil shape after the first top coating and baking and to repeat the same operation afterwards. It will increase the number of coating/baking steps, increase the costs and generate problems concerning equipment.

Moreover, if the curability is lowered in order to form a thick film without generating a popping by one operation of top coating and high temperature short time baking, the curing of the coating film is insufficient and causes problems such that the coating film surface becomes tacky or the coating film is prone to generate blocking.

The main purpose of the present invention is to provide a polyester resin type topcoat paint, in a polyester resin type paint for precoated steel plate, capable of forming a coating film having excellent hardness, processibility, alkali resistance, corrosion resistance, anti-tackiness of the coating surface, blocking resistance, curability etc. and having an excellent coating film appearance without generation of popping by coating in one operation of top coating and high temperature short time baking for a film thickness of more than 25 $\mu$m.

As a result of an intensive study the present inventors found that the above-mentioned purpose can be achieved by using a specific polyester resin, specific blocked polyisocyanate compound and resin fine particles in combination in a polyester resin type paint and completed the present invention.

SUMMARY OF THE INVENTION

According to the present invention there is provided a coating composition comprising a binder component consisting of (A) hydroxyl group-containing polyester resin having a number average molecular weight of 2,000–5 20,000, glass transition temperature of −40° C. to 30° C. and hydroxyl value of 5–95 mgKOH/g and (B) blocked polyisocyanate compound blocked with $\epsilon$-caprolactam, and the equivalent ratio of the blocked isocyanate groups in said blocked polyisocyanate compound (B)/the hydroxyl groups in said polyester resin (A) being in the range of 0.7–1.2, and (C) resin fine particles with an average particle diameter of 8–70 $\mu$m which do not completely melt at the time of coating film curing and containing 0.5–30 parts by weight of said resin fine particles (C) per 100 parts by weight of said binder component.

According to the present invention there is provided also a coated metal plate having a topcoat cured coating film of the film thickness of more than 30 $\mu$m formed of the above-mentioned coating composition on the metal plate through the intermediary of a polyester type primer coating film or an epoxy type primer coating film.

The coating composition of the present invention is described hereinafter in more detail.

DETAILED DESCRIPTION OF THE INVENTION

Hydroxyl Group-containing Polyester Resin (A):

The hydroxyl group-containing polyester resin (A) used as one of the binder components in the coating composition of the present invention is a polyester resin having at least one hydroxyl group in the molecule and includes, for example, oil-free polyester resin, oil-modified alkyd resin, and modified substances of these resins, for example, urethane-modified polyester resin, urethane-modified alkyd resin, epoxy-modified polyester resin etc.

The above-mentioned oil-free polyester resin consists of an esterified product of a polybasic acid component and a polyhydric alcohol component. As a polybasic acid component there is used mainly. for example, one or more dibasic acid selected from phthalic anhydride, isophthalic acid, terephthalic acid, tetrahydrophthalic anhydride, hexahydrophthalic anhydride, succinic acid, fumaric acid, adipic acid, sebacic acid, maleic acid etc. and lower alkyl esterified products of these acids, and, as necessary, a monobasic acid such as benzoic acid, crotonic acid, p-t-butylbenzoic acid etc. and a polybasic acid higher than tribasic acid such as trimellitic anhydride, methylcyclohexenetricarboxylic acid, pyromellitic anhydride etc. can be jointly used. As a polyhydric alcohol component there is used mainly, for example, a dihydric alcohol such as ethylene glycol, diethylene glycol, propylene glycol, 1,4-butanediol, neopentyl glycol, 3-methylpentanediol, 1,4-hexanediol, 1,6-hexanediol etc., and, as necessary, a polyhydric alcohol higher than trihydric alcohol such as glycerol, trimethylolethane, trimethylolpropane, pentaerythritol etc. can be jointly used. These polyhydric alcohols can be used singly or in mixing more than two. Esterification or ester exchange reaction between these two components can be conducte by a per se known method, in adjusting the reaction ratios of the acid component and the alcohol component so that the polyester resin to be formed would contain a hydroxyl group(s). As an acid component isophthalic acid, terephthalic acid and lower alkyl esters of these acids are particularly preferable.

Oil-modified alkyd resin is prepared by reacting an oil fatty acid in addition to the acid component and alcohol component described about the above-mentioned oil-free polyester resin by a per se known method so that the resin to be formed would contain a hydroxyl group(s). As an oil fatty acid there can be mentioned, for example, coconut oil fatty acid, soybean oil fatty acid, linseed oil fatty acid, safflower oil fatty acid, tall oil fatty acid, dehydrated castor oil fatty acid, tung oil fatty acid etc. Preferable oil length of an alkyd resin is less than 30%, particularly about 5–20%.

As a urethane-modified polyester resin there can be mentioned a reaction product of the above-mentioned oil-free polyester resin, or an oil-free polyester resin of a low molecular weight obtained by reacting an acid component and an alcohol component used in the preparation of the above-mentioned oil-free polyester resin, with a polyisocyanate compound made by a per se known method. Moreover, a urethane-modified alkyd resin includes a reaction product of the above-mentioned alkyd resin, or an alkyd resin of a low molecular weight obtained by reacting individual components used in the preparation of the above-mentioned alkyd resin, with a polyisocyanate compound made by a per se known method. As a polyisocyanate compound usable in the preparation of the urethane-modified polyester resin and the urethane-modified alkyd resin there can be mentioned, for example, hexamethylene diisocyanate, isophorone diisocyanate, xylylene diisocyanate, tolylene diisocyanate, 4,4'-diphenylmethane diisocyanate, 4,4-methylenebis(cyclohexylisocyanate), 2,4,6-triisocyanatotoluene etc. The above-mentioned urethane-modified resins can be preferably used when the degree of modification is that the amount of the polyisocyanate compound forming a urethane-modified resin is generally 30% by weight, particularly 3–15% by weight per the urethane-modified resin.

As an epoxy-modified polyester resin there can be mentioned reaction products of addition, condensation, grafting etc. between a polyester resin and an epoxy resin such as a reaction product between the carboxyl groups of the carboxyl group-containing polyester resin, prepared from the acid component and alcohol component to be used in the preparation of the above-mentioned polyester resin, and an epoxy group-containing resin, and a reaction product in which the hydroxyl groups in a hydroxyl group-containing polyester resin and the hydroxyl groups in an epoxy resin are bonded through the intermediary of a polyisocyanate compound. The preferable degree of modification in such an epoxy-modified polyester resin is that the amount of the epoxy resin is generally 0.1–30% by weight, particularly 5–20% by weight per the epoxy-modified polyester resin.

Among the above-mentioned polyester resins, oil-free polyester resin can be mentioned as particularly preferable.

Polyester resin (A), having a number average molecular weight in the range of 2,000–20,000, preferably 3,000–15,000, a glass transition temperature (Tg) in the range of –40° C. to 30° C., preferably –25° C. to 15° C., and a hydroxyl value in the range of 5–95 mgKOH/g, preferably 20–65 mgKOH/g, is used favorably in view of the processibility, hardness, curability and popping resistance of the coating film to be obtained.

In the present invention a glass transition temperature (Tg) is measured by a differential thermal analysis (DTA) and a number average molecular weight is measured by a gel permeation chromatography (GPC), using a calibration curve of the standard polystyrene.

Blocked Polyisocyanate Compound (B):

The blocked polyisocyanate compound (B) used as one of the binder components in the coating composition of the present invention is a polyisocyanate compound blocked by using $\epsilon$-caprolactam as a blocking agent, which has substantially no free isocyanate group and acts as a crosslinking agent, and can react with the above-mentioned polyester resin (A) to cure the resin (A).

As a polyisocyanate compound before the above-mentioned blocking there can be mentioned, for example, organic diisocyanates themselves such as aliphatic diisocyanates such as hexamethylene diisocyanate or trimethylhexamethylene diisocyanate; alicyclic diisocyanates such as hydrogenated xylylene diisocyanate or isophorone diisocyanate: aromatic diisocyanates such as tolylene diisocyanate or 4,4'-diphenylmethane diisocyanate, or aducts of these organic diisocyanates with polyhydric alcohol, low molecular weight hydroxyl group-containing polyester resin, water etc., cyclization polymers among the above-mentioned organic diisocyanates, or isocyanate-biurets etc.

By mixing the above-mentioned polyisocyanate compound and $\epsilon$-caprolactam as a blocking agent, the free isocyanate groups of the above-mentioned polyisocyanate compound can be easily blocked. By using $\epsilon$-caprolactam as a blocking agent, the popping resistance at the thermal curing of the coating film can be improved, compared with the case using as a crosslinking agent polyisocyanate compounds blocked with other blocking agents.

In the coating composition of the present invention the polyester resin (A), the binder component, and the blocked polyisiocyanate compound (B) are used in such ratios that the equivalent ratio of the blocked isocyanate groups in the blocked polyisocyanate compound (B)/the hydroxyl groups in the polyester resin (A) becomes in the range of 0.7–1.2, preferably 0.8–1.05. When the above-mentioned ratio is less than 0.7, generally the curability of the coating film declines, or more hydroxyl groups remain in the coating film, causing lower moisture resistance and deteriorated corrosion resistance of the coating film. On the other hand, when the above-mentioned ratio is more than 1.2, unreacted isocyanate groups generally remain in the coating film after the coating, and undesirable curing reactions due to the isocyanate groups proceed gradually, generating problems such as cracking of processed parts of the coating film with the lapse of time.

Resin Fine Particles (C):

In the coating composition of the present invention, as the resin fine particles (C), resin fine particles which do not completely melt at the curing of the coating film (under the baking condition of the coating film) and have an average particle diameter in the range of 8–70 $\mu$m, preferably 15–60 $\mu$m. These resin fine particles (C) contribute to improve the blocking resistance of the cured coating film formed from the coating composition of the present invention. The state "not completely molten" includes the state not molten at all and the states partially molten in which surface of the individual particles is partially covered with the molten substance.

When the average particle diameter of the above-mentioned resin fine particles (C) is less than 8 $\mu$m, generally the improvement effect of the blocking resistance of the coating film is not obtained sufficiently and when it is more than 70 $\mu$m, on the other hand, the appearance of the coating film and the coating operability tend to decline.

As the kind of resin of the resin fine particles (C) there can be mentioned, for example, polyamide resin such as nylon 6, nylon 11, nylon 12 etc.; poliimide resin, polyethylene resin, polypropylene resin, polyvinylidene fluoride resin, polytetrafluoroethylene, polyacrylonitrile resin, acrylic resin, polyurethane resin, phenolic resin, silicone resin, polyester resin etc. These can be used singly or in combinations. Particularly nylon resin, acrylic resin, polyurethane resin are preferable.

The mixing amount of the resin fine particles (C) can be in the range of 0.5–30 parts by weight, preferably 1–15 parts by weight per 100 parts by weight of the binder component consisting of the polyester resin (A) and the blocked polyisocyanate compound (B). When the mixing amount of the above-mentioned resin fine particles (C) is less than 0.5 parts by weight, the improvement effect of the blocking resistance of the coating film is not sufficient and when it is more than 30 parts by weight, on the other hand, the processibility of the coating film and the coating operability tend to decline.

Other Components:

The coating composition of the present invention can comprise substantially hydroxyl group-containing polyester resin (A), blocked polyisiocyanate compound (B) and resin fine particles (C), but is usually mixed with an organic solvent and may contain, as necessary, organic resin powder or inorganic powder of an average particle diameter of more than 1 μm and less than 8 μm; curing catalyst; color pigment, glittering pigment; per se known additives for paint such as polyethylene wax, carnauba wax, lanolin wax, lubricity-imparting agent, anti-foaming agent, leveling agent, antisettling agent etc.

The above-mentioned organic solvent is mixed in order to improve the applicability etc. of the coating composition of the present invention and includes solvent which can dissolve or disperse the polyester resin (A) and blocked polyisocyanate compound (B). As their specific example there can be mentioned, for example, aromatic hydrocarbon type solvent such as xylene, high boiling aromatic petroleum-derived hydrocarbon solvent etc.; ketone type solvent such as cyclohexanone, isophorone etc.; ester type solvent such as butyl acetate, ethylene glycol monoethyl ether acetate, diethylene glycol monoethyl ether acetate etc.; alcohol type solvent such as n-butanol, isobutanol etc.; ether alcohol type solvent such as ethylene glycol monoethyl ether, ethylene glycol monobutyl ether, diethylene glycol monobutyl ether etc.

Above all, high boiling aromatic petroleum-derived hydrocarbon solvent is preferable. These organic solvents can be used singly or in mixing more than two.

As the kind of resin of the above-mentioned organic resin powder of an average particle diameter of more than 1 μm and less than 8 μm, there can be mentioned polyamide resin such as nylon 6, nylon 11, nylon 12 etc.; poliimide resin, polypropylene resin, polyvinylidene fluoride resin, polytetrafluoroethylene, polyacrylonitrile resin, acrylic resin, polyurethane resin, phenolic resin, silicone resin, urea resin etc. These can be used singly or in combinations.

As the kind of the above-mentioned inorganic powder of an average particle diameter of more than 1 μm and less than 8 μm, there can be mentioned pigments, which may usually be called as fillers, such as talc, clay, silica, mica, alumina, barium sulphate, calcium carbonate,etc. They can be used singly or in combinations. As the above-mentioned inorganic powder, silica is preferable above all.

By mixing at least one kind of powder selected from the above-mentioned organic resin powder and inorganic powder of an average particle diameter of more than 1 μm and less than 8 μm in the coating composition of the present invention, the anti-tackiness of the surface of the coating film can be improved. The suitable mixing amount of the powder, in case it is mixed, is in the range of generally 1–30 parts by weight, preferably 4–20 parts by weight per 100 parts by weight of the binder component consisting of the polyester resin (A) and the blocked polyisiocyanate compound (B). Above all, a joint use of 0.5–15 parts by weight, preferably 2–10 parts by weight of an organic resin powder and 0.5–15 parts by weight, preferably 2–10 parts by weight of an inorganic powder is preferable in view of the balance of the anti-tackiness of the surface of the coating film and the processibility of the coating film.

The above-mentioned curing catalyst is mixed, as necessary, in order to promote the curing reaction between the polyester resin (A) and the blocked polyisocyanate compound (B) and a curing catalyst, which accelerates the dissociation of the blocking agent of the blocked polyisocyanate compound (B), is preferable. As a preferable curing catalyst there can be mentioned, for example, organometallic catalyst such as tin octylate, dibutyltin di(2-ethylhexanoate), dioctyltin di(2-ethylhexanoate), dioctyltin dilaurate, dibutyltin oxide, dioctyltin oxide, lead 2-ethylhexanoate etc.

As the aforementioned color pigment, which may be used as necessary, there can be mentioned color pigments, which are usually used in the field of paints, for example, white pigments such as titanium white, zinc oxide etc.; cyanine blue, cyanine green, organic red pigments of azo type, quinacridone type etc., organic yellow pigments of benzimidazolone type, isoindolinone type, isoindoline type, quinophthalone type etc.; inorganic color pigments such as titanium yellow, iron oxide red, carbon black, chrome yellow, various calcined pigments etc.

As the above-mentioned titanium white, a titanium white made by surface treatment of rutile type titanium oxide, which does not contain coarse particles of larger than 0.5 μm, with zirconia and alumina, above all, a titanium white made by formation of an inner coating layer with 0.2–1.5% by weight of zirconia per titanium oxide and an outer coating layer with 1.5–8.0% by weight of alumina per titanium oxide over the above-mentioned rutile type titanium oxide, which does not contain coarse particles, is preferable in view of the alkali resistance etc. of the coating film to be obtained. In case of mixing titanium white in order to form a pale color coating film, its preferable mixing amount is in the range of 50–120 parts by weight, particularly 80–110 parts by weight in view of the hiding power, processibility etc. per 100 parts by weight of the total of the resin (A) and the compound (B).

As the aforementioned glittering pigment, which may be used as necessary, there can be mentioned glittering pigments, which are usually used in the field of paints, for example, at least one kind selected from aluninium powder, copper powder, nickel powder, coated mica powder having pearl-like reflected light, glittering graphite etc.

Each individual component mentioned above can be prepared in a coating composition by using a usual paint manufacturing technology and the obtained coating composition can be used favorably as a topcoat paint.

Coating:

The coating composition of the present invention can be coated on various substrates, for example, metal plate, plastics, glass plate etc. Particularly metal plates are preferably used as substrate. As metal plates used as substrate there can be mentioned, for example, non-treated metal plates such as cold rolled steel plate, zinc-plated type steel plate, aluminium plate; metal plates made by chemical treatment such as phosphate treatment, chromate treatment, chromium phosphate treatment etc. on these non-trteated metal plates. Above all, non-treatd or chemically treated zinc-plated type steel plates can be preferably used.

As zinc-plated type steel plates there can be mentioned, for example, molten zinc-plated steel plate, electric zinc-plated steel plate, iron-zinc alloy-plated steel plate, nickel-zinc alloy-plated steel plate, aluminium-zinc alloy-plated steel plate, and chemically treated zinc-plated type steel plates made by conducting a chemical treatment such as zinc phosphate treatment, chromate treatment etc. on these zinc-plated type steel plates.

Primer-coated metal plates, made by forming a primer coating film on the above-mentioned metal plates for the purpose of improving corrosion resistance and adhesivity of the paint, can be used as substrate, too. As the primer coating film, coating films obtained from a polyester type primer, epoxy type primer are preferable and can have a film thickness of usually 2–10 μm. It is possible to form a pollution-free primer coating film by using as a primer paint a pollution-free non-chromium type primer paint without containing a harmful pigment such as chromium type rust preventive pigment such as strontium chromate, zinc chromate, calcium chromate etc. As a rust preventive pigment used for a non-chromium type primer paint there can be mentioned, for example, zinc oxide, zinc phosphate, zinc phosphosilicate, aluminium zinc phosphate, calcium zinc phosphate, zinc phosphite, calcium phosphite, aluminium phosphite, calcium zinc cyanamide, zinc-treated aluminium polyphosphate, aluminium tripolyphosphate, calcium zinc molybdate, zinc molybdate, zinc phosphomolybdate, aluminium phosphomolybdate, calcium-ion-changed amorphous silica fine particles etc. They can be used singly or in mixing more than two.

The coating of the coating composition of the present invention is not particularly limited, but can be conducted by using the method of, for example, roll coating, curtain flow coating, immersion coating, spray coating etc. The coating film thickness in that case is also not particularly limited, but a coating with a film thickness of more than 25 μm, particularly in the range of 30–45 μm, a dried coating film thickness with which a good coating film formation was difficult by a single high temperature short time coating/baking operation of a polyester type paint up to the present, is preferable, because the coating composition of the present invention does not generate popping usually with a dried film thickness of at least 30 μm in a high temperature short time baking, for example, at the highest material temperature of 230° C. for 60 seconds.

The curing condition of the coating composition of the present invention can be selected suitably from the baking conditions under which the coating composition cures. and a baking condition in the range of usually 160–260° C. of highest material temperature and 15–120 seconds, particularly 190–240° C. of highest material temperature and 20–90 seconds, is preferable, in case of a coil coating in which a continuously moving long metal plate or primer-coated metal plate is continuously coated by a roll coating etc.

EXAMPLES

The present invention is hereinafter described more specifically by way of Examples. In the following "parts" and "%" are by weight.

Examples 1–9 and Comparative Examples 1–9

Each topcoat paint was obtained by conducting a conversion to paint, using each component of its mixing ratio shown in the following Table 1. The mixing amount of each component in Table 1 is indicated in solid content weight. In the paint manufacturing of the topcoat paint of each Example and Comparative Example, a dispersion of titanium white, a white pigment, was conducted. Moreover, the paint viscosity was adjusted to about 90 seconds (Ford cup #4, 25° C.) by using a mixed solvent of cyclohexanone/Swasol 1500 (an aromatic petroleum-derived high boiling solvent; a product of Cosmo Oil Co., Ltd.)=60/40 (ratio by weight) for adjusting of paint viscositiy etc. In Table 1 the equivalent ratios of the blocked isocyanate groups in the blocked polyisocyanate compound/hydroxyl groups in the polyester resin (abbreviated as (NCO/OH)eq. ratio in Table 1) in the binder component of each topcoat paint are shown, too.

TABLE 1

|  |  | Example | | | | | | | | |
|---|---|---|---|---|---|---|---|---|---|---|
|  |  | 1 | 2 | 3 | 4 | 5 | 6 | 7 | 8 | 9 |
| Polyester resin | Vylon KS-1480 V (*1) |  |  | 86.6 |  |  |  |  |  |  |
|  | Vylon KS-1370 V (*2) |  | 88.8 |  |  |  |  |  |  |  |
|  | Vylon KS-1520 V (*3) | 81.3 |  |  | 81.3 | 81.3 | 81.3 | 84.3 | 81.3 | 81.3 |
|  | Vylon KS-1500 V (*4) |  |  |  |  |  |  |  |  |  |
|  | Vylon KS-1660 V (*5) |  |  |  |  |  |  |  |  |  |
|  | Vylon 35CS (*6) |  |  |  |  |  |  |  |  |  |
| Isocyanate | Desmodure TPLS2957 (*7) | 18.7 | 11.2 | 13.4 | 18.7 | 18.7 | 18.7 | 15.7 | 18.7 | 18.7 |
|  | Desmodure BL3175 (*8) |  |  |  |  |  |  |  |  |  |
|  | Takenate XB-170N-BA (*9) |  |  |  |  |  |  |  |  |  |
| (NCO/OH) | eq. ratio in binder | 1.0 | 1.0 | 1.0 | 1.0 | 1.0 | 1.0 | 0.8 | 1.0 | 1.0 |
| Catalyst | Formate TK-1 (*10) | 0.19 | 0.11 | 0.13 | 0.19 | 0.19 | 0.19 | 0.16 | 0.19 | 0.19 |
|  | Titan White CR-97 (*11) | 90 | 90 | 90 | 90 | 90 | 90 | 90 |  | 90 |
| Pigment | Titan White CR-95 (*12) |  |  |  |  |  |  |  | 90 |  |
|  | Alumipaste MR-9000 (*13) |  |  |  |  |  |  |  |  | 5 |
| Resin fine particle | Taftic A-20 (*14) |  |  |  |  | 10 |  |  |  |  |
|  | Orgasol 2002ES-3 (*15) |  |  |  |  |  | 10 |  |  |  |
|  | TEXTURE 5380W (*16) | 5 | 10 | 15 | 1 |  |  | 5 | 5 | 5 |
| Powder | Sefrallube WR (*17) | 5 |  |  | 10 |  | 2 | 5 | 5 | 5 |
|  | Syloid 308 (*18) | 5 | 5 |  | 10 |  | 2 | 5 | 5 |  |

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Polyester resin | Vylon KS-1480 V (*1) |  |  |  |  |  |  |  |  |  |
|  | Vylon KS-1370 V (*2) |  |  |  |  |  |  |  |  |  |
|  | Vylon KS-1520 V (*3) |  |  |  | 76.9 | 88.9 | 82.7 | 89.0 | 81.3 | 81.3 |
|  | Vylon KS-1500 V (*4) | 89.6 |  |  |  |  |  |  |  |  |

TABLE 1-continued

|  |  |  |  |  |  |  |  |  |  |  |
|---|---|---|---|---|---|---|---|---|---|---|
|  | Vylon KS-1660 V (*5) |  | 65.0 |  |  |  |  |  |  |  |
|  | Vylon 35CS (*6) |  |  | 98.7 |  |  |  |  |  |  |
| Isocyanate | Desmodure TPLS2957 (*7) | 10.4 | 35.0 | 1.3 | 23.1 | 12.1 |  |  | 18.7 | 18.7 |
|  | Desmodure BL3175 (*8) |  |  |  |  |  | 17.3 |  |  |  |
|  | Takenate XB-170N-BA (*9) |  |  |  |  |  |  | 21.0 |  |  |
| (NCO/OH) | eq. ratio in binder | 1.0 | 1.0 | 1.0 | 1.3 | 0.6 | 1.0 | 1.0 | 1.0 | 1.0 |
| Catalyst | Formate TK-1 (*10) | 0.10 | 0.34 | 0.01 | 0.23 | 0.12 | 0.17 | 0.21 | 0.19 | 0.19 |
|  | Titan White CR-97 (*11) | 90 | 90 | 90 | 90 | 90 | 90 | 90 | 90 | 90 |
| Pigment | Titan White CR-95 (*12) |  |  |  |  |  |  |  |  |  |
|  | Alumipaste MR-9000 (*13) |  |  |  |  |  |  |  |  |  |
| Resin fine | Taftic A-20 (*14) |  |  |  |  |  |  |  |  |  |
| particle | Orgasol 2002ES-3 (*15) |  |  |  |  |  |  |  |  |  |
|  | TEXTURE 5380W (*16) | 5 | 5 | 5 | 5 | 5 | 5 | 5 | 35 |  |
| Powder | Sefrallube WR (*17) | 5 | 5 | 5 | 5 | 5 | 5 | 5 |  | 10 |
|  | Syloid 308 (*18) | 5 | 5 | 5 | 5 | 5 | 5 | 5 |  | 5 |

"Note" in Table 1 each means as follows.

Polyester resins shown as (*1)–(*6) in Table 1 are polyester resins produced by Toyobo Co., Ltd. and have the characteristic values shown in the following Table 2.

TABLE 2

|  | Number average molecular weight | Glass transition temperature (° C.) | Hydroxyl value (mgKOH/g) |
|---|---|---|---|
| Vylon KS-1480V | 8,200 | 5 | 28 |
| Vylon KS-1370V | 9,500 | 2 | 23 |
| Vylon KS-1520V | 6,400 | 2 | 42 |
| Vylon KS-1500V | 9,800 | 40 | 21 |
| Vylon KS-1660V | 2,700 | 12 | 98 |
| Vylon 35CS | 23,000 | 7 | 2.5 |

(*7) Desmodure TPLS2957: ε-Caprolactam-blocked HDI isocyanurate type polyisocyanate compound; a product of Sumitomo Bayer Urethane Co., Ltd.

(*8) Desmodure BL-3175: Methyl ethyl ketoximeblocked HDI isocyanurate type polyisocyanate compound: a product of Sumitomo Bayer Urethane Co., Ltd.

(*9) Takenate XB-170N-BA: Primary alcohol-blocked HDI isocyanurate type polyisocyanate compound; a product of Takeda Chemical Industries, Ltd.

(*10) Formate TK-1: Organotin type curing catalyst; a product of Takeda Chemical Industries, Ltd.

(*11) Titan White CR-97: Rutile type titanium white pigment subjected to a surface treatment with alumina and zirconia, prepared by eliminating coarse particles with particle diameter of larger than 0.5 μm; a product of Ishihara Sangyo Kaisha, Ltd.

(*12) Titan White CR-95: Rutile type titanium white pigment subjected to a surface treatment with alumina and silica; a product of Ishihara Sangyo Kaisha, Ltd.

(*13) Alumipaste MR-9000: glittering aluminium fine powder with an average particle diameter of about 10 μm; commercial name: Asahi Kasei Alumipaste MR-9000; a product of Asahikasei-Metals Ltd.

(*14) Taftic A-20: Polyacrylonitrile resin fine particles, average particle diameter about 26 μm; a product of Toyobo Co., Ltd.

(*15) Orgasol 2002ES-3: Nylon 12 resin fine particles, average particle diameter of about 30 μm; a product of Ato Chimie, France.

(*16) TEXTURE 5380W: Polypropylene resin fine particles, average particle diameter about 40 μm; a product of Shamrock Technologies, Inc.

(*17) Sefrallube WR: Polytetrafluoroethylene powder, average particle diameter about 5 μm; a product of Central Glass Co., Ltd.

(*18) Syloid 308: Silica fine powder, average particle diameter about 5 μm; a product of Grace GmbH.

Examples 10–18 and Comparative Examples 10–18

On a chromate-treated electric zinc-plated steel plate of 0.5 mm thickness, KP Color 8625 Primer made by Kansai Paint Co., Ltd. (a polyester type primer paint for precoated steel plate containing chromate type rust preventive pigment; abbreviated as "KP8625" in Table 3) was coated so that the dried film thickness would be about 4 μm and baked at the highest material temperature of 220° C. for 30 seconds to obtain a primer-coated steel plate. On the primer-coated steel plate each topcoat paint obtained by the above-mentioned Examples 1–9 and Comparative Examples 1–9 was coated so that the dried film thickness would be about 35 μm and baked at the highest material temperature of 220° C. for 60 seconds to obtain each top-coated steel plate.

Example 19

The same operation as in Example 10, except by using as a primer paint KP Color 8000 Primer (an epoxy resin type primer paint for precoated steel plate containing chromate type rust preventive pigment; a product of Kansai Paint Co., Ltd.; abbreviated as "KP8000" in Table 3) instead of KP Color 8625 Primer, was conducted to obtain a top-coated steel plate.

Example 20

The same operation as in Example 10, except by using as a primer paint Primer Paint NC mentioned below, without containing chromate type rust preventive pigment, instead of KP Color 8625 Primer, was conducted to obtain a top-coated steel plate.

Primer Paint NC Without Containing Chromate Type Rust Preventive Pigment

A primer paint obtained by mixing 266.7 parts (solid content: 80 parts) of Vylon EP-2940 (*19), 20 parts of Cymel 303 (*20), 30 parts of aluminium tripolyphosphate, 20 parts of titanium white, 2.0 parts of Nacure 5225 (*21) and an appropriate amount of a mixed solvent [1/1 (by weight) mixed solvent of Solvesso 150 (aromatic hydrocarbon type solvent: a product of Esso Sekiyu K.K.) and cyclohexanone] and dispersing so that the particle diameter of coarse pigment particle becomes less than 10 microns (abbreviated as "Pr-NC" in Table 3).

(*19) Vylon EP-2940: Epoxy-modified polyester resin solution with 30% solid content, number average molecular weight of the resin: about 10,000, glass transition temperature: about 72° C.; a product of Toyobo Co., Ltd.

(\*20) Cymel 303: Methyl etherified melamine resin; a product of Mitsui Cytec Co., Ltd.

(\*21) Nacure 5225: Amine-neutralized solution of dodecylbenzenesulphonic acid, sulphonic acid amount: 25%, curing catalyst.

Various tests were conducted for the coated steel plates obtained by the above-mentioned Examples 10–20 and Comparative Examples 10–18. The test results are shown in Table 3 mentioned later.

The tests in Table 3 were conducted according to the following test methods.

Test Methods

Popping resistance: Appearance of the coating surface of the coated steel plate (30 cm×30 cm) was observed with the naked eye and evaluated according to the following standard.

- ○: No generation of popping (bubbling) is observed on the coating surface.
- Δ: Slight generation of popping (bubbling) is observed on the coating surface.
- X: Remarkable generation of popping (bubbling) is observed on the coating surface.

Coating surface gloss: The specular reflection ratio at the incident angle of 60 degrees of the coating surface of the coated steel plate was measured according to the specular gloss at the incident angle of 60 degrees prescribed in JIS K-5400 7.6 (1990).

Pencil hardness: Pencil scratch test was conducted on the coating film of the coated steel plate, according to JIS K-5400 8.4.2 (1990). Evaluation was made by the breakage method.

Impact resistance: In accordance with JIS K-5400 8.4.2 (1990) DuPont impact resistance test in a room at 20° C., an impact was given to the coating surface of the coated steel plate under the conditions of falling weight: 500 g, diameter of impact point: ½ inches, falling height: 50 cm. Then an adhesive cellophane tape was adhered to the impacted part and the degree of peeling of the coating film was evaluated according to the following standards, when the tape was peeled in an instant.

- ○: No peeling is observed on the coating surface.
- Δ: Slight peeling is observed on the coating surface.
- X: Considerable peeling is observed on the coating surface.

Bending resistance: The coated steel plate was bent 180 degrees (TO bending) in putting the coated surface of the coated steel plate outside in a room at 20° C. and the degree of cracking generation on the coating film at the bent part was evaluated. A coated steel plate 1 hour after the coating (early stage) and that 2 weeks after the coating (after a lapse of time) were used.

- ⊚: No cracking is observed on the coating surface.
- ○: Cracking is observed slightly on the coating surface.
- Δ: Cracking is observed considerably on the coating surface.
- X: Cracking is observed remarkably on the coating surface, Anti-tackiness of the coating surface: The coating surface of the coated steel plate was touched with a finger and the degree of tackiness of the coating surface was evaluated according to the following standard.

- ⊚: No tackiness is felt on the coating surface.
- ○: Tackiness is felt slightly on the coating surface.
- Δ: Tackiness is felt considerably on the coating surface.
- X: Tackiness is felt remarkably on the coating surface.

Blocking resistance: On a chromate-treated electric zinc-plated steel plate of 0.5 mm thickness, "KP Color 1510 beige" (a polyester type paint for back coating of precoated steel plate; a product of Kansai Paint Co., Ltd.) was coated so that the dried film thickness would be about 5 μm and baked at the highest material temperature of 220° C. for 30 seconds to obtain a KP Color 1510-coated plate. The KP Color 1510-coated plate was cut in a size of 5×5 cm$^2$ and onto the surface of the coating film the surface of each coated steel plate of a size of 5×5 cm$^2$ was put together. After being kept under the pressure of 80 kg/cm$^2$ for 24 hours, the easiness of peeling both coated plates was evaluated according to the following standard.

- ⊚: Both coated plates do not stick together and separate only if they are leant.
- ○: Both coated plates slightly stick together, but are easily peeled by hand.
- Δ: Both coated plates considerably stick together. but can be peeled by hand without damaging the coating film.
- X: Both coated plates strongly stick together and either cannot be peeled by hand or the coating film is damaged even if they are peeled by hand.

Alkali resistance: After being immersed in a sodium hydroxide aqueous solution of 5% concentration at 30° C. for 24 hours, the plate for testing was drawn up and the coating surface was visually observed and evaluated according to the following standard.

- ○: No change is observed on the coating surface.
- Δ: Slight whitening or blistering is observed on the coating surface.
- X: Remarkable whitening or blistering is observed on the coating surface.

Solvent resistance: After a piece of gauze impregnated with methyl ethyl ketone was moved back and forth 50 times for about 5 cm distance on the coating surface under the loading of about 1 kg/cm$^2$ in a room at 20° C., the state of the coating surface was visually observed and evaluated according to the following standard.

- ○: No change is observed on the coating surface.
- Δ: No whitening or swelling of the coating film is observed, but scratches are observed on the coating surface.
- X: Whitening or swelling of the coating film is observed.

Moisture resistance of the processed part: The coated steel plate was bent 180 degrees (TO bending) in putting the coated surface of the coated steel plate outside in a room at 20° C. and the degree of cracking and peeling of the coating film at the bent processed part was evaluated according to the following standard, after the prosessed coated plate had been kept in a moisture resistance test machine at 50° C., moisture about 100%RH for 1,000 hours.

- ○: None of the cracking generation and peeling of the coating film is observed.
- Δ: Cracking generates, but no peeling of the coating film is observed.
- X: Cracking generates remarkably and peeling of the coating film is observed at the processed part.

Corrosion resistance: On the coating surface of the coated steel plate there is cut a cross-cut reaching the metal surface passing through the paint film with a knife and a salt water spraying test in accordance with the salt water spraying test prescribed in JIS Z-2371 was conducted on the coated steel plate for 1,000 hours. Evaluation was made by the width of rust or blister from the cut.

- ⊚: Maximum width of rust or blister is less than 1 mm at one side.

○: Maximum width of rust or blister is more than 1 mm and less than 3 mm at one side.

Δ: Maximum width of rust or blister is more than 3 mm and less than 9 mm at one side.

X: Maximum width of rust or blister is more than 10 mm at one side.

(A) hydroxyl group-containing polyester resin having a number average molecular weight of 3,000–15,000, glass transition temperature of −25° C. to 15° C. and hydroxyl value of 5–95 mgKOH/g and (B) blocked polyisocyanate compound blocked with ε-caprolactam, the equivalent ratio of the blocked iso-

TABLE 3

| | | | | | Example | | | | | | |
|---|---|---|---|---|---|---|---|---|---|---|---|
| | | 10 | 11 | 12 | 13 | 14 | 15 | 16 | 17 | 18 | 19 | 20 |
| Kind of primer paint | | KP8625 | KP8625 | KP8625 | KP8625 | KP8625 | KP8625 | KP8625 | KP8625 | KP8625 | KP8000 | Pr—NC |
| Kind of topcoat paint (Example No.) | | Example 1 | Example 2 | Example 3 | Example 4 | Example 5 | Example 6 | Example 7 | Example 8 | Example 9 | Example 1 | Example 1 |
| Test item | Popping resistance | ○ | ○ | ○ | ○ | ○ | ○ | ○ | ○ | ○ | ○ | ○ |
| | Coating surface gloss | 11 | 12 | 14 | 8 | 40 | 18 | 12 | 11 | 15 | 11 | 11 |
| | Pencil hardness (breakage) | 3H | 3H | 3H | 3H | 3H | 3H | 3H | 3H | 3H | 3H | 3H |
| | Impact resistance | ○ | ○ | ○ | ○ | ○ | ○ | ○ | ○ | ○ | ○ | ○ |
| | Bending resistance early stage | ◎ | ◎ | ◎ | ◎ | ◎ | ◎ | ◎ | ◎ | ◎ | ◎ | ◎ |
| | after lapse of time | ◎ | ◎ | ◎ | ◎ | ◎ | ◎ | ◎ | ◎ | ◎ | ◎ | ◎ |
| | Anti-tackiness of coating surface | ◎ | ◎ | ○ | ◎ | ○ | ◎ | ◎ | ◎ | ◎ | ◎ | ◎ |
| | Blocking resistance | ◎ | ◎ | ◎ | ◎ | ◎ | ◎ | ◎ | ◎ | ◎ | ◎ | ◎ |
| | Alkali resistance | ◎ | ◎ | ◎ | ◎ | ◎ | ◎ | ◎ | ○ | ◎ | ◎ | ◎ |
| | Solvent resistance | ○ | ○ | ○ | ○ | ○ | ○ | ○ | ○ | ○ | ○ | ○ |
| | Moisture resistance of processed part | ○ | ○ | ○ | ○ | ○ | ○ | ○ | ○ | ○ | ○ | ○ |
| | Corrosion resistance | ◎ | ◎ | ◎ | ◎ | ◎ | ◎ | ◎ | ◎ | ◎ | ◎ | ◎ |

| | | Comparative Example | | | | | | | | |
|---|---|---|---|---|---|---|---|---|---|---|
| | | 10 | 11 | 12 | 13 | 14 | 15 | 16 | 17 | 18 |
| Kind of primer paint | | KP8625 | KP8625 | KP8625 | KP8625 | KP8625 | KP8625 | KP8625 | KP8625 | KP8625 |
| Kind of topcoat paint (Example No.) | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
| Test item | Popping resistance | ○ | ○ | ○ | ○ | ○ | Δ | X | ○ | ○ |
| | Coating surface gloss | 12 | 13 | 12 | 12 | 12 | 12 | 12 | 10 | 11 |
| | Pencil hardness (breakage) | 4H | 3H | 2H | 3H | 3H | 3H | 4H | 3H | 3H |
| | Impact resistance | ○ | ○ | ○ | ○ | ○ | ○ | ○ | ○ | ○ |
| | Bending resistance early stage | X | Δ | ○ | ○ | ○ | ○ | ○ | X | ○ |
| | after lapse of time | X | Δ | ○ | X | ○ | ○ | ○ | X | ○ |
| | Anti-tackiness of coating surface | ◎ | ◎ | ◎ | ◎ | ◎ | ◎ | ◎ | ○ | ◎ |
| | Blocking resistance | ◎ | ◎ | ◎ | ◎ | ◎ | ◎ | ◎ | ◎ | X |
| | Alkali resistance | ◎ | ◎ | ◎ | ◎ | ◎ | ◎ | ◎ | ◎ | ◎ |
| | Solvent resistance | ○ | ○ | X | ○ | Δ | ○ | ○ | ○ | ○ |
| | Moisture resistance of processed part | Δ | Δ | Δ | ○ | Δ | ○ | ○ | ○ | ○ |
| | Corrosion resistance | ○ | ○ | Δ | ○ | Δ | ○ | ○ | ○ | ○ |

Obviously from the results shown in the above-mentioned Table 1, by using the coating composition of the present invention, a coating film having excellent hardness. processability, alkali resistance, corrosion resistance, anti-tackiness of the coating surface, blocking resistance, curability without generation of popping in one operation of high temperature short time baking for a film thickness of more than 25 μm. Thus, the coating composition of the present invention is particularly effective in case of forming a thick coating film in a high temperature short time baking and, above all, is preferable as a paint for a precoated steel plate.

What is claimed is:

1. A coating composition comprising a binder component consisting of cyanate groups in said blocked polyisocyanate compound (B)/hydroxyl groups in said polyester resin (A) being in the range of 0.7–1.2, and (C) resin fine particles with an average particle diameter of 8–70 μm which do not completely melt at the time of coating film curing, said coating composition containing 0.5–30 parts by weight of said resin fine particles (C) per 100 parts by weight of said binder component.

2. A coating composition according to claim 1, wherein the polyester resin (A) has a hydroxyl value of 20–65 mgKOH/g.

3. A coating composition according to claim 1, wherein the polyester resin (A) is an oil-free polyester resin.

4. A coating composition according to claim 1, wherein the equivalent ratio of the blocked isocyanate groups in the blocked polyisocyanate compound (B)/the hydroxyl groups in the polyester resin (A) in the binder component is in the range of 0.8–1.05.

5. A coating composition according to claim 1, wherein the resin fine particles (C) have an average particle diameter in the range of 15–60 μm.

6. A coating composition according to claim 1, wherein the resin fine particles (C) consist of at least one kind of resin fine particles selected from nylon resin, acrylic resin and polyurethane resin.

7. A coating composition according to claim 1, containing 1–15 parts by weight of the resin fine particles (C) per 100 parts by weight of said binder component.

8. A coating composition according to claim 1, further containing 1–30 parts by weight of at least one kind of a powder, having an average particle diameter of more than 1 μm and less than 8 μm, selected from organic resin powders and inorganic powders per 100 parts by weight of the binder component.

9. A coating composition according to claim 8, containing 0.5–15 parts by weight of an organic resin powder and 0.5–15 parts by weight of an inorganic powder per 100 parts by weight of the binder component.

10. A coating composition according to claim 8 or 11, wherein the inorganic powder is silica fine powder.

11. A coating composition according to claim 1, further containing an organometallic curing catalyst.

12. A coating composition according to claim 1, further containing a color pigment or glittering pigment.

13. A coating composition according to claim 12, containing as color pigment 50–120 parts by weight of titanium white, made by a surface treatment of rutile type titanium oxide without containing coarse particles of more than 0.5 μm with zirconia and alumina, per 100 parts by weight of said binder component.

* * * * *